(12) United States Patent
Hiramatsu et al.

(10) Patent No.: US 6,636,729 B1
(45) Date of Patent: Oct. 21, 2003

(54) APPARATUS AND METHOD FOR RECEIVING RADIO SIGNALS ACCORDING TO VARIABLE WEIGHTING FACTORS

(75) Inventors: Katsuhiko Hiramatsu, Yokosuka (JP); Atsushi Matsumoto, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/423,660

(22) PCT Filed: Mar. 29, 1999

(86) PCT No.: PCT/JP99/01589

§ 371 (c)(1),
(2), (4) Date: Nov. 22, 1999

(87) PCT Pub. No.: WO99/50965

PCT Pub. Date: Oct. 7, 1999

(30) Foreign Application Priority Data

Mar. 30, 1998 (JP) .......................... 10-102197

(51) Int. Cl.⁷ .............................................. H04B 7/00
(52) U.S. Cl. ................... 455/278.1; 455/273; 455/296; 375/346
(58) Field of Search ................... 455/278.1, 273, 455/272, 137, 562, 63, 67.1, 67.3, 561, 130, 131, 132, 226.1, 226.3, 269, 289, 296, 277.1, 277.2; 375/349, 346, 347, 316, 147, 148; 342/378, 383, 384; 370/345, 347

(56) References Cited

U.S. PATENT DOCUMENTS

| | | | |
|---|---|---|---|
| 5,819,168 A | * 10/1998 | Golden et al. | ............... 455/303 |
| 5,875,216 A | * 2/1999 | Martin | ..................... 455/278.1 |
| 5,966,095 A | 10/1999 | Hiramatsu et al. | ........... 342/383 |
| 6,147,985 A | * 11/2000 | Bar-David et al. | ........... 370/347 |
| 6,208,632 B1 | * 3/2001 | Kowalski et al. | ........... 370/335 |

FOREIGN PATENT DOCUMENTS

| | | | |
|---|---|---|---|
| JP | 2-121428 | 5/1990 | ............. H04J/3/14 |
| JP | 6-252810 | 9/1994 | ........... H04B/7/005 |
| JP | 6-284052 | 10/1994 | ........... H04B/7/005 |
| JP | 7-297733 | 11/1995 | ............. H04B/1/10 |
| JP | 10-56406 | 2/1998 | ............. H04B/3/10 |

OTHER PUBLICATIONS

English language abstract of JP 6–252810.
English language abstract of JP 7–297733.
English language abstract of JP 2–121428.
English language abstract of JP 10–56406.
English language abstract of JP 6–284052.
"Waveform Equalization Technology for Digital Mobile Communications", ISBN4–88657–801–2, Triceps Co., Ltd., p. 103, (Jun. 1, 1996).

* cited by examiner

*Primary Examiner*—William Trost
*Assistant Examiner*—Rafael Perez-Gutierrez
(74) *Attorney, Agent, or Firm*—Greenblum & Bernstein, P.L.C.

(57) ABSTRACT

Signals received from antennas are input to weighting factor calculation sections 105 and 106. Weighting factor calculation section 105 calculates weighting factors so as to eliminate an interference signal using the antenna reception signals and known signals of a desired signal. Weighting factor calculation section 106 sequentially updates weighting factors so as to minimize the difference between a combined signal and its reference signal using the weighting factors calculated by weighting factor calculation section 105 as the initial values. On the other hand, reception quality measurement section 108 measures the reception quality of the combined signal and outputs the measurement result to weighting factor switching section 107. After receiving the measurement result, weighting factor switching section 107 switches weighting factors to be used for combination at the time the reception quality changes.

10 Claims, 6 Drawing Sheets

SLOT CONFIGURATION (FRAME FORMAT)

FIG. 6

COMBINATION DIRECTION ACCORDING TO KNOWN SIGNAL POSITION (FROM FIRST PART TO LATTER PART)

APPARATUS AND METHOD FOR RECEIVING RADIO SIGNALS ACCORDING TO VARIABLE WEIGHTING FACTORS

TECHNICAL FIELD

The present invention relates to an apparatus and method for radio reception equipped with an adaptive array antenna capable of controlling directivity.

BACKGROUND ART

An adaptive array antenna is known as an antenna system that can control directivity. "Waveform Equalization Technology for Digital Mobile Communications" (compiled under the supervision of Jun Horikoshi, Triceps Co., Ltd.) describes that in an array antenna consisting of a plurality of antennas, applying an amplitude/phase shift to the output of each antenna and then combining them will change the directivity of the array. The adaptive array antenna uses the principle above, and adaptively controls directivity in accordance with changes in surrounding conditions by determining a weighting factor of each antenna output based on a certain control algorithm and multiplying each antenna output by this weighting factor.

Figure 1:
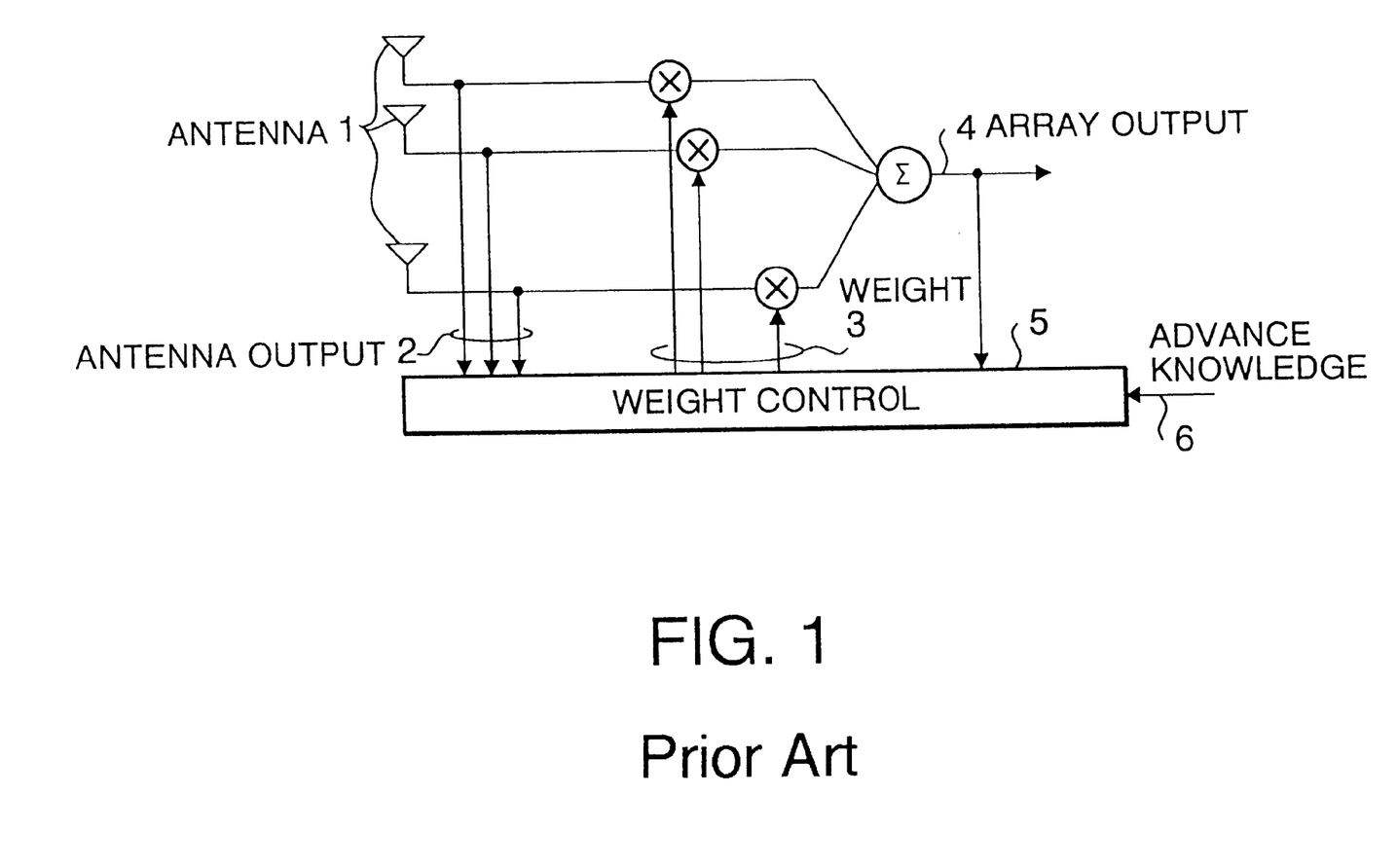
FIG. 1 is a block diagram showing a configuration of a conventional adaptive array antenna reception apparatus.

FIG. 1 is a block diagram showing a configuration of a conventional adaptive array antenna apparatus (hereinafter referred to as "reception adaptive array"). As shown in the figure, antenna outputs 2 of a plurality of antennas 1 are multiplied by weighting factors 3 respectively and the antenna outputs weighted with these weighting factors 3 for respective antennas are combined into array output 4.

Weighting factors for their respective antenna outputs are controlled by weighting factor control section 5. Weighting factor control section 5 uses three kinds of information to control weighting factors; array combined output 4, respective antenna outputs 2 and advance knowledge 6 regarding a desired signal. There is also a system that does not use array output 4 to control weighting factors.

Figure 2:
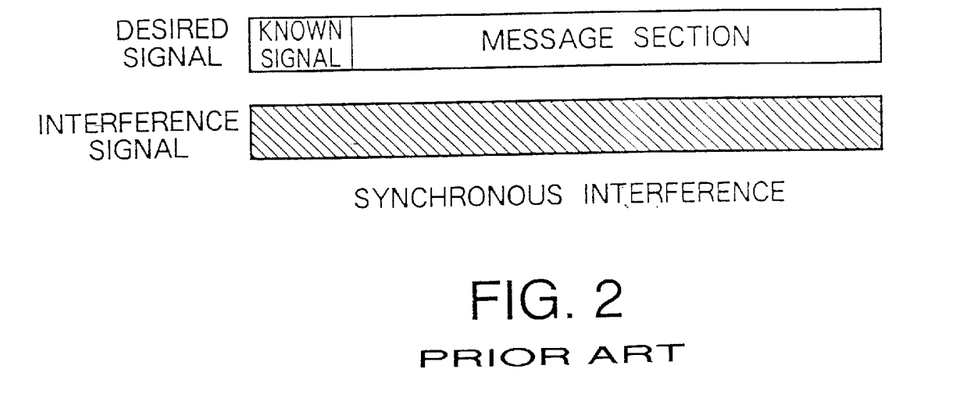
FIG. 2 is a diagram showing a case where an interference signal continuously interferes with a desired signal.

Conventionally, a weighting factor control algorithm assuming synchronous interference is applied to weighting factor control section 5. In a weighting factor control algorithm assuming synchronous interference, weighting factors are controlled so as to eliminate such an interference signal that is present continuously during the interval from the beginning to the end of a desired signal (hereinafter referred to as "synchronous interference") as shown in FIG. 2.

Figure 3:
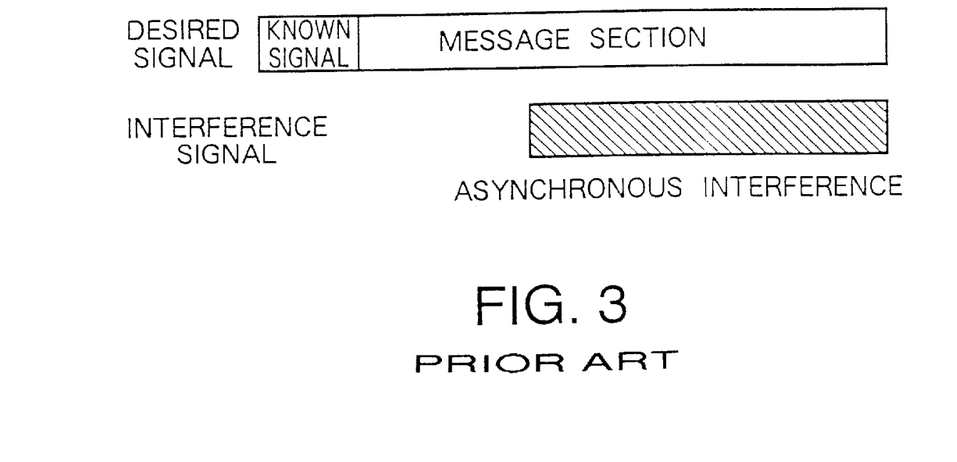
FIG. 3 is a diagram showing a case where an interference signal mixes into a desired signal at some midpoint.

However, if a signal provided by a communication user who is different from the communication user who is transmitting the desired signal is the interference signal, synchronization between the desired signal and interference signal is not guaranteed, and there is a possibility that the interference signal will mix into the desired signal at some midpoint as shown in FIG. 3.

Thus, the conventional system has the problem that, if the interference signal mixes into the desired signal at some midpoint, the weighting factors calculated using a known signal of the desired signal before the interference signal starts to interfere cannot fully eliminate the interference signal.

DISCLOSURE OF INVENTION

It is an objective of the present invention to provide an apparatus and method for adaptive array antenna radio reception that can appropriately control weighting factors for array combination and effectively eliminate or suppress an interference signal even if the interference signal mixes into a desired signal at some midpoint.

This objective is achieved by a radio reception apparatus comprising a combination section that weights and then combines reception signals corresponding to a plurality of antenna elements respectively and a factor adaptation section that adaptively controls weighting of the reception signals above according to the time at which the interference signal mixes into the desired signal.

BEST MODE FOR CARRYING OUT THE INVENTION

With reference now to the attached drawings, the embodiments of the present invention are explained in detail below.

(Embodiment 1)

Figure 4:
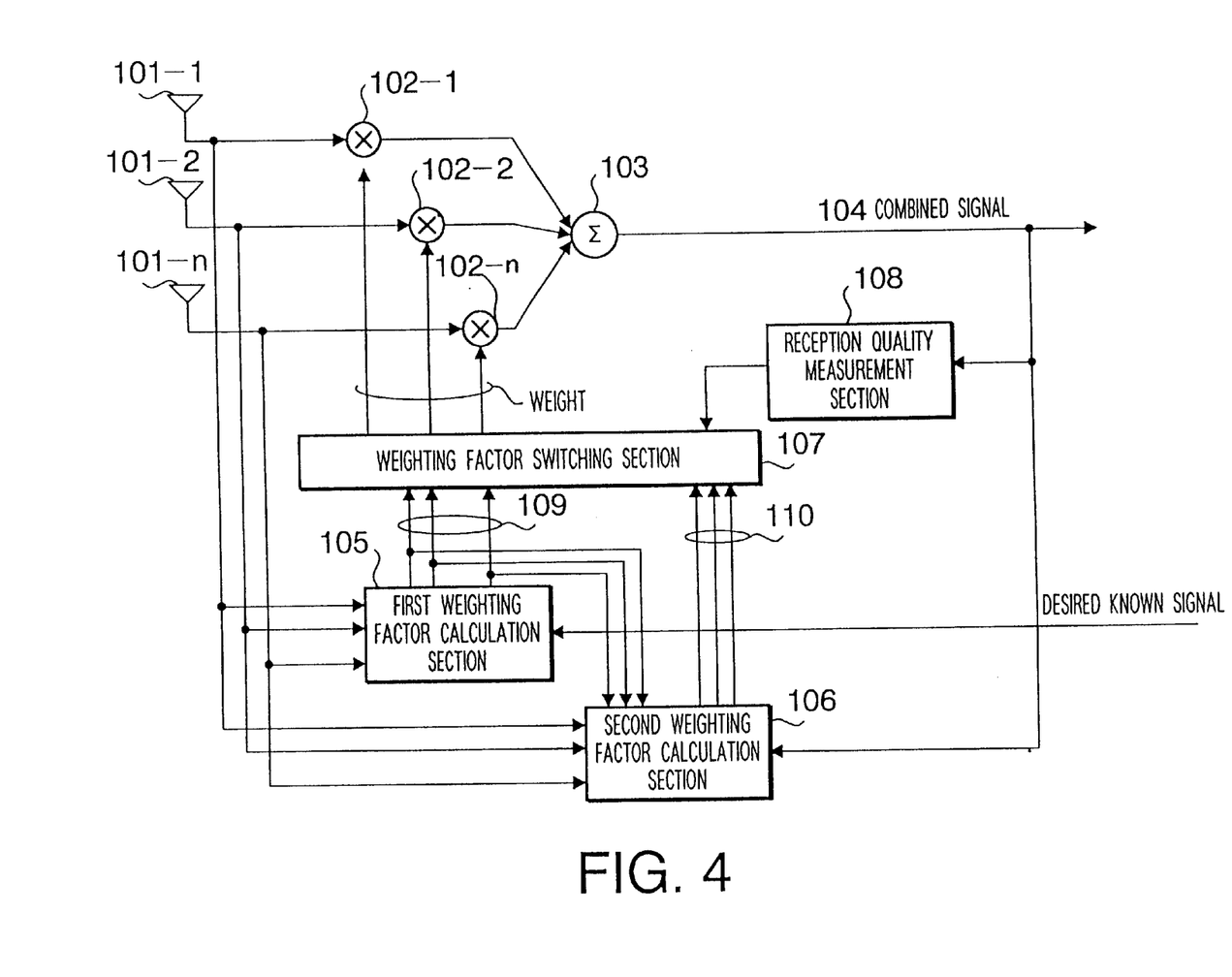
FIG. 4 is a block diagram showing a configuration of an adaptive array antenna reception apparatus according to Embodiment 1 of the present invention.

FIG. 4 is a block diagram showing a configuration of an adaptive array antenna reception apparatus according to Embodiment 1 of the present invention. This adaptive array antenna reception apparatus inputs reception signals output from a plurality of antenna elements 101-1 to 101-n to their respective multipliers 102-1 to 102-n where those reception signals are multiplied by weighting factors (weights). Then, adder 103 combines the signals output from multipliers 102-1 to 102-n into combined signal 104 which becomes array output.

The weights multiplied on the reception signals are calculated by either first weighting factor calculation section 105 or second weighting factor calculation section 106. Weighting factor switching section 107 selects weighting factors calculated by either first weighting factor calculation section 105 or second weighting factor calculation section 106 and gives these weighting factors to multipliers 102-1 to 102-n. Weighting factor switching section 107 controls switching based on the reception quality measurement result of combined signal 104 which is the array output input from reception quality measurement section 108.

Then, the operation of the adaptive array antenna reception apparatus configured as shown above is explained in detail below.

The reception signals received from antenna elements 101-1 to 101-n are input to first weighting factor calculation section 105 and second weighting factor calculation section 106. First weighting factor calculation section 105 calculates weighting factors 109 such that eliminate an interference signal using the antenna reception signals and known signals of a desired signal. Second weighting factor calculation section 106 calculates weighting factors 110 and updates them sequentially so as to minimize the difference between combined signal 104 and its reference signal using weighting factors 109 calculated by first weighting factor calculation section 105 as the initial values.

In the case of the synchronous interference shown in FIG. 2, a desired signal, which is the reception signal stripped of an interference signal, is obtained by multiplying the antenna reception signals by corresponding weighting factors 109 calculated by first weighting factor calculation section 105 and then combining them.

This is because the known signal part of the reception signals when first weighting factor calculation section 105 calculates weighting factors 109 contains both a desired signal and an interference signal and the weighting factors obtained from there can extract only the desired signal by eliminating the interference signal from the reception signals.

On the other hand, in the case of the asynchronous interference shown in FIG. 3, the known signal part of the reception signals does not contain an interference signal, and the weighting factors obtained from there cannot eliminate the interference signal that interferes later, and therefore the reception quality deteriorates at the time the interference signal starts to interfere.

In order to cope with such asynchronous interference, the present embodiment sequentially updates weighting factors 110 at second weighting factor calculation section 106 and switches the weighting factors to be multiplied on the antenna reception signals from weighting factors 109 to weighting factors 110 at the time the interference signal starts to interfere. By adaptively switching weighting factors in this way, the present embodiment can eliminate or suppress an interference signal contained in the antenna reception signals and extract a desired signal even in the case of asynchronous interference.

Then, reception quality measurement section 108 measures the reception quality of combined signal 104 and inputs the measured value to weighting factor switching section 107. Weighting factor switching section 107 determines the time at which the quality of combined signal 104 changed from the reception quality measured value and switches the weighting factors to weighting factors 110 output from second weighting factor calculation section 106 at that time.

As shown above, Embodiment 1 of the present invention can effectively eliminate interference signals in both the case of synchronous interference shown in FIG. 2 and the case of asynchronous interference shown in FIG. 3, that is, not only the case where an interference signal exists from the beginning but also the case where an interference signal mixes into a desired signal at some midpoint. This makes possible adaptive array reception using weighting factors that optimize the reception quality even if an interference signal exists, making it possible to effectively suppress an interference signal and extract a desired signal.

In the algorithm that sequentially updates weighting factors used in second weighting factor calculation section 106, the amount of calculation tends to become enormous, but using the configuration that allows the switching of the weighting factor calculation sections as shown in the present embodiment makes it possible to use the algorithm only when it is necessary and thus reduce the time and memory required to calculate weighting factors.

In Embodiment 1 above, second weighting factor calculation section 106 sequentially updates weighting factors 110 so as to minimize the difference between the combined signal and its reference signal, but the above means is not essential in the present invention and it is obvious that weighting factors can be calculated by other means that do not use known signals.

Furthermore, the present embodiment described the case with two weighting factor calculation sections, but the number of weighting factor calculation sections is not limited to 2; more weighting factor calculation sections can also be added.

Moreover, the present embodiment described the case where second weighting factor calculation section 106 uses the weighting factors calculated by first weighting factor calculation section 105 as the initial values, but this need not always be followed; arbitrary constants can also be used and antenna reception signals can also be combined using weighting factors from second weighting factor calculation section 106.

(Embodiment 2)

Figure 5:
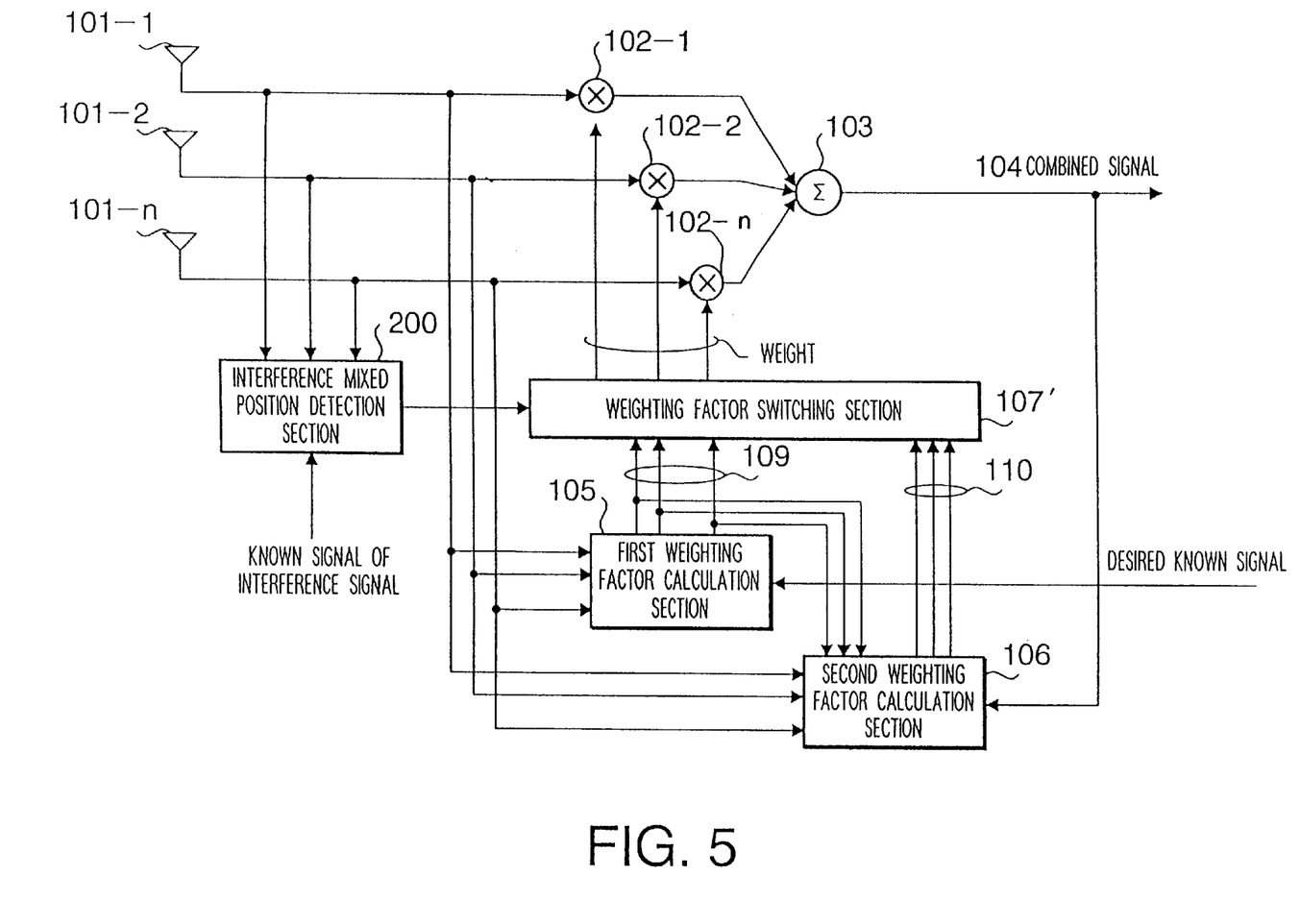
FIG. 5 is a block diagram showing a configuration of an adaptive array antenna reception apparatus according to Embodiment 2 of the present invention.

FIG. 5 shows a configuration example of an adaptive array antenna radio reception apparatus according to Embodiment 2 of the present invention. The parts that have the same functions as those of the adaptive array antenna radio reception apparatus shown in FIG. 4 are assigned the same numbers.

The present embodiment detects the interference mixed position of an interference signal from antenna reception signals prior to combination to acquire timing for switching weighting factors.

The adaptive array antenna radio reception apparatus according to the present embodiment inputs a plurality of antenna reception signals not only to first and second weighting factor calculation sections 105 and 106 but also to interference mixed position detection section 200. Interference mixed position detection section 200 performs correlation detection using known signals of an interference signal for the start to end of antenna reception signals (the start to end of a transmission unit such as 1 slot or cell. Interference mixed position detection section 200 predicts the position at which the highest correlation value is detected as the interference mixed position and outputs the predicted interference signal mixed position to weighting factor switching section 107'.

Then, the operation of the adaptive array antenna radio reception apparatus configured as shown above is explained in detail below.

Signals received from the antennas are input to first weighting factor calculation section 105, second weighting factor calculation section 106 and interference mixed position detection section 200. First weighting factor calculation section 105 calculates weighting factors 109 such that eliminate interference signals using the antenna reception signals and known signals of a desired signal. Second weighting factor calculation section 106 sequentially updates weighting factors 110 so as to minimize the difference between combined signal 104 and its reference signal using the weighting factors 109 calculated by first weighting factor calculation section 105 as the initial values.

In the case of the synchronous interference shown in FIG. 2, a desired signal, which is the reception signal stripped of an interference signal, is obtained by multiplying the antenna reception signals by corresponding weighting factors 109 calculated by first weighting factor calculation section 105 and then combining them. This is because the known signal part of the reception signals when first weighting factor calculation section 105 calculates weighting factors contains both a desired signal and an interference signal and the weighting factors obtained from there can extract only the desired signal by eliminating the interference signal from the reception signals.

However, in the case of the asynchronous interference shown in FIG. 3, the known signal part of the reception signals does not contain an interference signal, and the weighting factors obtained from there cannot eliminate the interference signal that interferes later, and therefore the reception quality deteriorates at the time the interference signal starts to interfere. In this case, the present embodiment does not use the known signals to calculate weighting factors, but sequentially updates weighting factors 110 at second weighting factor calculation section 106, thus making it possible to suppress the interference signal contained in the antenna reception signals and extract the desired signal.

Then, the antenna reception signals are input to interference mixed position detection section 200 where the start to end of the antenna reception signals is subjected to correlation detection using known signals of the interference signal. Interference mixed position detection section 200 predicts the position at which the highest correlation value is detected as the interference mixed position and outputs the predicted interference mixed position to weighting factor switching section 107'. If the detection position is behind an appropriate position, weighting factor switching section 107' switches weighting factors to be used for combination at that position to weighting factors 110.

As shown above, Embodiment 2 of the present invention can effectively eliminate or suppress interference signals in both the case of synchronous interference shown in FIG. 2 and the case of asynchronous interference shown in FIG. 3 by predicting the position at which an interference signal starts to interfere and switching the weighting factors from that position. Therefore, regardless of the time at which an interference signal mixes into a desired signal, if the interference signal exists in any known signal part of the antenna reception signal, it is possible to obtain a desired signal with the interference signal suppressed from the combined signal using the weighting factors calculated there.

The present embodiment uses correlation detection as a means for predicting the position at which an interference signal mixes into a desired signal, but this need not always be followed; it is also possible to predict the mixed position of an interference signal from the reception field intensity, for example.

(Embodiment 3)

In the radio communication system in the present embodiment, the transmitting side transmits by radio a transmission signal with known signals placed in a plurality of locations in a slot and the receiving side receives the transmission signal above, calculates weighting factors using the known signal parts where an interference signal exists, weights signals received from a plurality of antennas with these weighting factors calculated and combines them.

Figure 6:
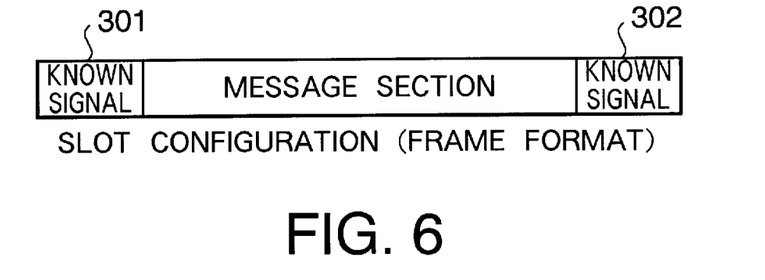
FIG. 6 is a diagram showing a slot configuration of a radio communication system according to Embodiment 3 of the present invention.

As shown in FIG. 6, the transmission data has a slot configuration (frame format) where known signals 301 and 302 are placed in the first part and latter part, which allows the combination direction to be switched depending on which known signal part contains both a desired signal and interference signal, the first part or the latter part.

Figure 7:
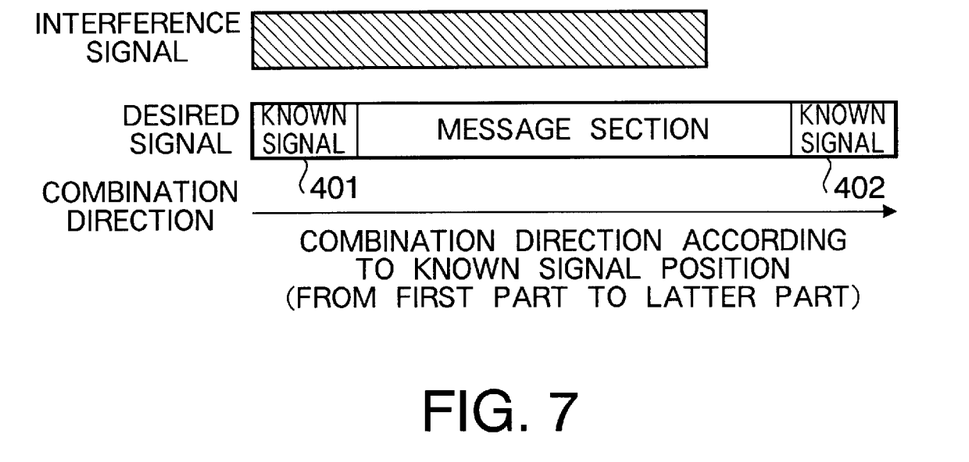
FIG. 7 is a diagram showing a combination direction according to the position of a known signal in the first part according to Embodiment 3.

In the case of the synchronous interference shown in FIG. 2, if the interference signal ceases to exist at some midpoint as shown in FIG. 7, weighting factors are calculated using known signal part 401 in the first part of an antenna reception signal. Since the known signal part in this first part contains both a desired signal and interference signal, weighting factors calculated using this part can suppress the interference signal. It is possible to extract the desired signal with the interference signal suppressed from the combined signal obtained from the antenna reception signals using those weighting factors.

Moreover, in a case where no interference signal exists in known signal 500 (FIG. 8) in the first part and there is an interference signal in known signal 501 in the latter part, weighting factors are calculated using known signal part 501 in the latter part. In this case, at least one slot of antenna reception signals is buffered, then weighting factors are calculated using known signal part 501 in the latter part and then the buffered antenna reception signals are combined using those weighting factors.

Figure 8:
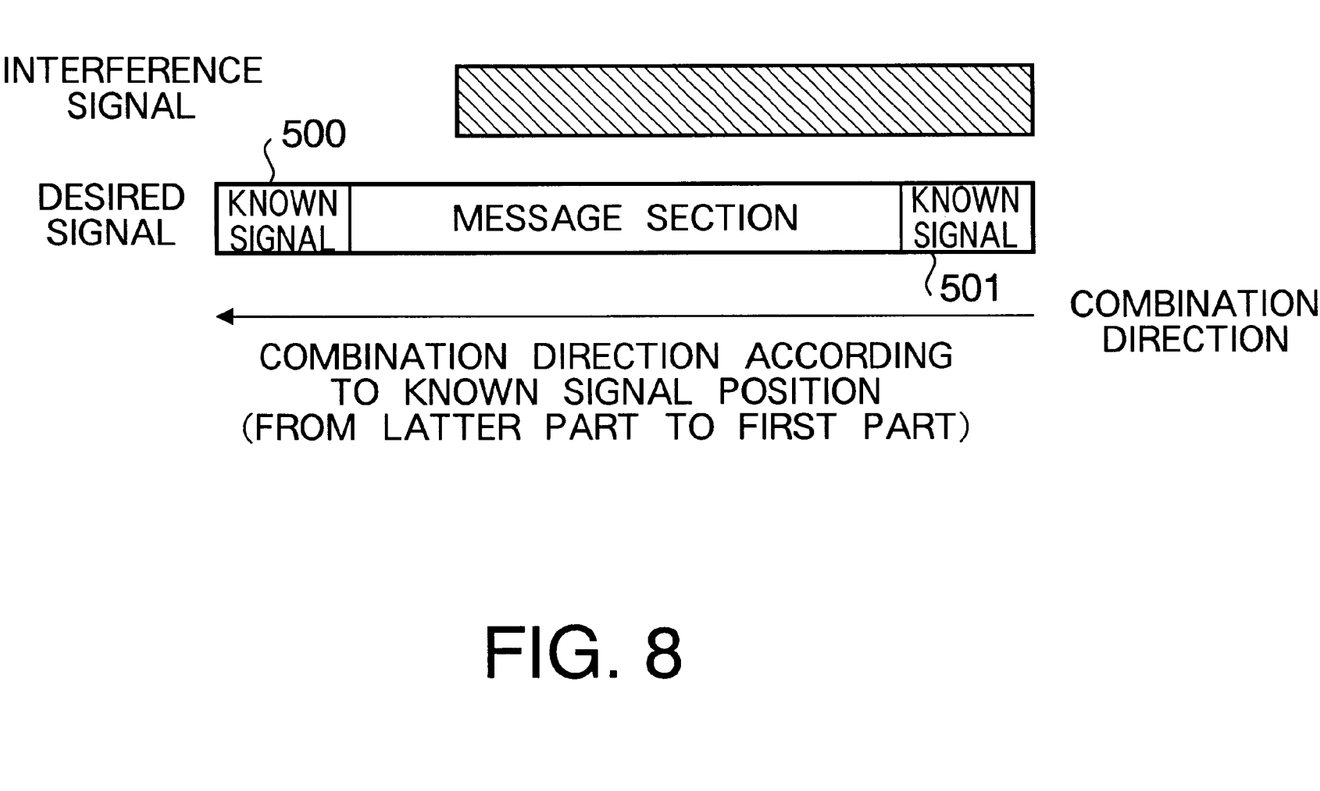
FIG. 8 is a diagram showing a combination direction according to the position of another known signal in the latter part according to Embodiment 3.

In this way, selection can be made from two demodulation methods; one in which weighting factors are calculated using the known signal in the first part of a slot (frame format) and these weighting factors are combined from the first part to the latter part, or from the latter part to the first part, and the other in which weighting factors are calculated using the known signal in the second part and these weighting factors are combined from the latter part to the first part, or from the first part to the latter part. In either case, it is possible to extract a desired signal from the combined signal with the interference signal suppressed.

Embodiment 3 uses a slot configuration (frame format) containing known signals in first part 301 and latter part 302, but it is possible to extract a desired signal if the known signal parts are placed so that an interference signal is captured whenever it starts to interfere.

It is also possible to adopt a configuration that calculates weighting factors using a known signal in the first part of the slot and another known signal in the latter part of the same slot, compares the reception qualities of both combined signals weighted with the weighting factors above and uses the combined signal weighted with the weighting factor with the better reception quality.

This configuration makes it possible to eliminate an interference signal by calculating weighting factors using the known signal in the first part in the case of synchronous interference, and using the known signal in the latter part in the case of asynchronous interference.

Furthermore, it is also possible to install the adaptive array antenna radio reception apparatus above in a mobile unit and/or base station apparatus and construct a radio system that carries out a radio communication between the mobile unit and base station.

As described in detail above, the present invention can effectively suppress an interference signal from a combined reception signal by adaptively selecting and switching weighting factors according to the time at which the interference signal mixes into a desired signal.

This application is based on the Japanese Patent Application No.HEI 10-102197 filed on Mar. 30, 1998, entire content of which is expressly incorporated by reference herein.

INDUSTRIAL APPLICABILITY

The radio reception apparatus of the present invention is applicable to a base station apparatus in a digital radio communication system.

What is claimed is:

1. A radio reception method comprising:
   receiving signals through a plurality of antenna elements;
   weighting the received signals by corresponding weighting factors;

combining the weighted signal;

detecting a position in a received signal, at which an interference signal mixes into the received signal;

calculating a first weighting factor from the signal received before the detected position;

calculating a second weighting factor from the signal received before the detected position; and switching factor for weighting the received signals from the first weighting factor to the second weighing factor at the detected position.

2. A radio reception apparatus comprising:

a comprising signals received by a plurality of antenna elements and weighted by corresponding weighting factors;

a first weighting factor calculator that calculates a first weighting factor from a first known signal positioned in a front portion of a slot in a received signal;

a second weighting factor calculates a second weighting factor from a second known signal positioned in a rear portion of the slot in the received signal; and a comparator that compares a reception quality of a first combined signal and a second combined signal, produced by the combiner using the first weighting factor and the second weighting factor, respectively, the comparator selecting the one of the first combined signal and the second combined signal having a better reception quality.

3. A radio reception method comprising:

receiving signals through a plurality of antenna elements;

weighting each of the received signals by a corresponding weighting factor;

combining the weighted signals to obtain a combined signal;

calculating a first weighting factor from a first known signal positioned in a front portion of a slot in the received signal;

calculating a second weighting factor from a second known signal positioned in a rear portion of the slot in the received signal;

comparing a reception quality of a first combined signal, obtained using the first weighting factor, with a reception quality of a second combined signal, obtained using the second weighting factor, and selecting one of the first combined signal and the second combined signal based on the better reception quality.

4. A radio reception apparatus comprising:

a combiner that weights signals, received through a plurality of antenna elements, using weighting factors, and that combines the weighted signals;

a position detector that determines a position in a received signal at which an interference signal mixes into the received signal;

a first weighting factor calculator that calculates a first weighting factor from the received signal before the position determined by the position detector;

a second weighting factor calculator that calculates a second weighting factor from the received signal after the position determined by the position detector; and a switch that switches the weighting factors used in the combiner from the first weighting factor to the second weighting factor at the position determined by the position detector.

5. The radio reception apparatus according to claim 4, wherein the position detector comprises a measurer that measures a reception quality of the received signal; and wherein a position at which the reception quality deteriorates below a predetermined quality level is determined as the position at which the interference signal mixes into the received signal.

6. The radio reception apparatus according to claim 4, wherein the position detector comprises a correlator that measures correlation between at least one received signal and a known signal of the interference signal.

7. The radio reception apparatus according to claim 6, wherein a position at which the measured correlation is maximum is determined as the position at which the interference signal mixes into the received signal.

8. The radio reception apparatus according to claim 4, wherein the second weighting factor calculator calculates the second weighting factor using the first weighting factor as an initial value.

9. A radio reception apparatus comprising:

a receiver that receives signals by an adaptive array antenna comprising a plurality of antenna elements, each received signal comprising a slot in which a plurality of known signals are positioned;

a combiner that weighs the received signals using corresponding weighting factors and that combines the weighted signals into a combined signal;

a detector that detects a known signal from the plurality of known signals that overlaps with an interference signal; and a calculator that calculates the weighting factors, based on the detected known signal, the calculated weighting factors minimizing the interference signal in the combined signal.

10. A radio reception method comprising:

receiving signals by an adaptive array antenna comprising a plurality of antenna elements, each received signal comprising a slot in which a plurality of known signals are positioned;

weighting the received signals by corresponding weighting factors and combining the weighted signals;

detecting, from among the plurality of known signals, a known signal that overlaps with an interference signal; and calculating the weighting factor using the detected known signal to minimize the interference signal included in the combined signal.

* * * * *

UNITED STATES PATENT AND TRADEMARK OFFICE
CERTIFICATE OF CORRECTION

PATENT NO. : 6,636,729 B1
DATED : October 21, 2003
INVENTOR(S) : K. Hiramatsu et al.

It is certified that error appears in the above-identified patent and that said Letters Patent is hereby corrected as shown below:

Column 7,
Line 1, "signal" should read -- signals --.
Line 7, "before" should be -- after --.
Line 8, after "switching" insert -- the weighting --.
Line 12, after "a" insert -- a combiner that produces a plurality of combined signals, each combined signal --.
Line 19, before "calculates" insert -- calculator that --.

Column 8,
Line 18, after "between" insert -- the --.

Signed and Sealed this

Ninth Day of March, 2004

JON W. DUDAS
*Acting Director of the United States Patent and Trademark Office*